Sept. 5, 1961 A. KALLEL 2,999,150
ADJUSTABLY MOUNTED PANEL LIGHT
Filed Aug. 12, 1957 2 Sheets-Sheet 1
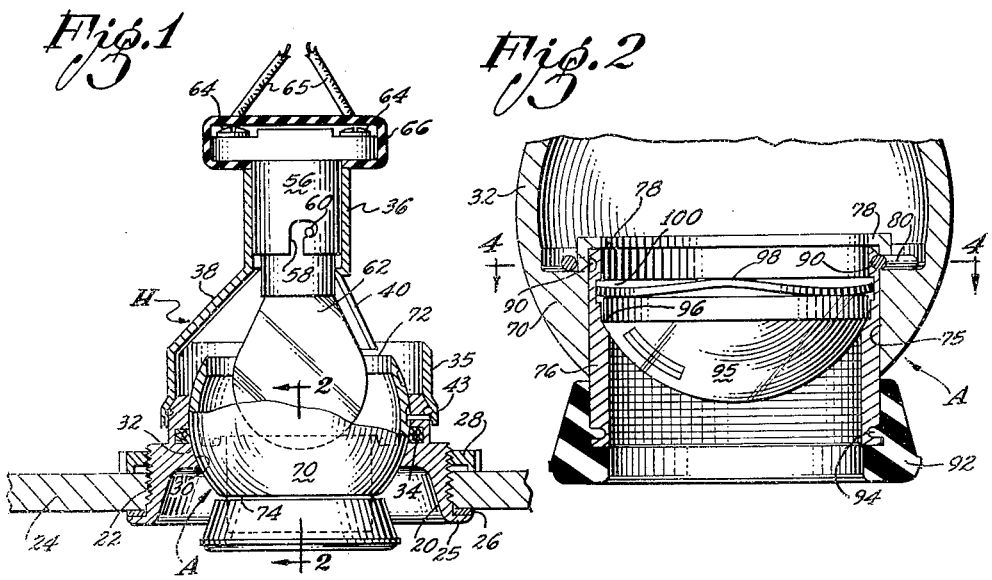
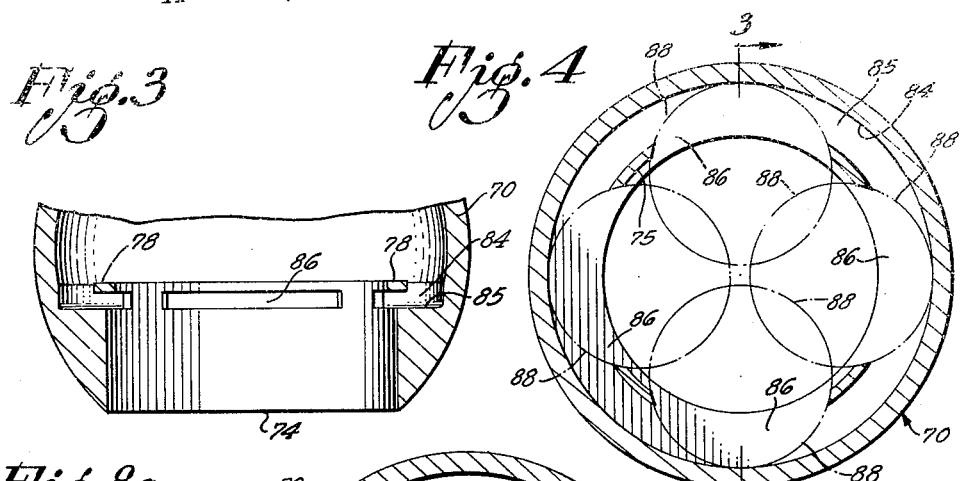
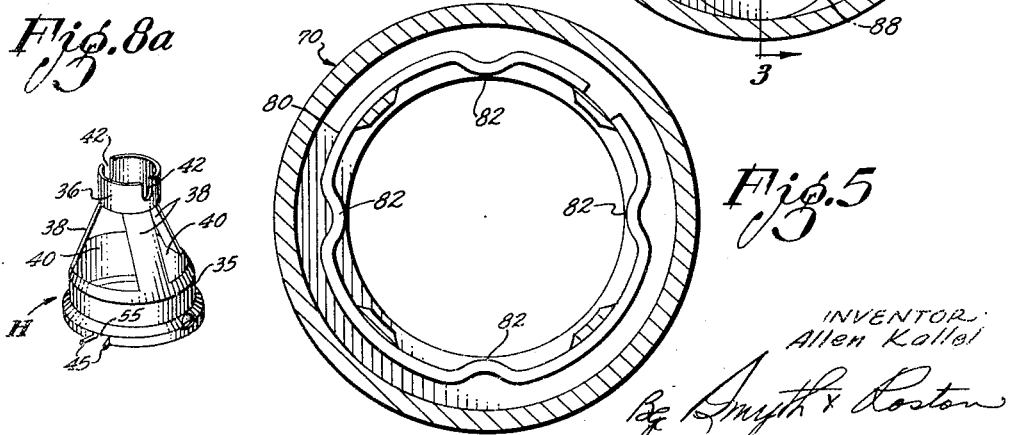
INVENTOR.
Allen Kallel
By Smyth & Roston
Attorneys Sept. 5, 1961  A. KALLEL  2,999,150
ADJUSTABLY MOUNTED PANEL LIGHT
Filed Aug. 12, 1957  2 Sheets-Sheet 2

INVENTOR.
Allen Kallel
By Smyth & Roston
Attorneys

United States Patent Office 2,999,150
Patented Sept. 5, 1961

2,999,150
ADJUSTABLY MOUNTED PANEL LIGHT
Allen Kallel, Los Angeles, Calif., assignor to Wemac Company, Inglewood, Calif., a corporation of California
Filed Aug. 12, 1957, Ser. No. 677,492
16 Claims. (Cl. 240—7.35)

This invention relates to light fixtures, and more particularly relates to light fixtures for mounting in the ceiling panels or wall panels of vehicles such as airplanes, railway passenger cars and busses.

Since the invention has special advantages for use in aircraft and is being initially embodied for that purpose, the description of an aircraft panel light fixture is selected for the present disclosure. Those skilled in the art will find in this embodiment adequate guidance for applying the underlying principles of the invention to other specific purposes.

The present embodiment of the invention meets certain problems that are encountered in the installation of light fixtures in aircraft to serve as individual reading lights for passengers. One of these problems is to provide troublefree wiring for a panel light fixture which is adjustable to direct a beam of light through a range of angles fore and aft of the aircraft as well as through a lateral range of angles. A typical panel light fixture for this purpose comprises a lamp housing with a ball and socket mounting that permits the required universal adjustability through the two different ranges of angles. The difficulty is that the swinging of such a lamp housing repeatedly flexes the wiring attached thereto and the repeated flexing tends to loosen the wire connections and to cause fatigue failure of the wires. In many instances, the ball and socket mounting also permits continued rotation of the lamp housing in one rotary direction to result in serious twisting of the wiring.

Another problem that arises when a lamp housing of such a light fixture has a ball and socket mounting is that room must be provided behind the panel in which the lighting fixture is mounted to permit the lamp housing to swing laterally in all radial directions. Because of this requirement for lateral clearance, such a light fixture cannot be placed close to a structural member and two such light fixtures cannot be placed close together. In many installations a desirable location for a panel light is immediately alongsside a structural member and in some instances it is highly desirable to place two of the light fixtures close together.

A further problem is that while such a light fixture must provide for adjustability of the direction of the light beam in two ranges perpendicular to each other, each of these two ranges might have definite limits. In this instance, it is contemplated that the range of fore and aft adjustment of the light beam will be 46° to suite the convenience of a seated passenger, but the lateral adjustment will be limited to 6° to keep the passenger from adjusting the light beam in a manner to annoy a passenger in an adjacent seat.

A still further problem is to provide a lamp for the convenience of a seated passenger that may be mounted either directly above the seated passenger or at a location spaced laterally from a point directly above the passenger. Thus, it is commonly desirable to mount two light fixtures in the ceiling panel directly above one of two passengers that are seated side by side with the light beam of one of the lamps adjustable fore and aft through a vertical plane for the convenience of the passenger immediately below the light fixture and with the light beam from the other lamp adjustable fore and aft in a plane inclined from the vertical for the convenience of the other passenger. In this particular embodiment of the invention, the second fore and aft plane is inclined approximately 20° from the vertical, each of the two planes being at the midpoint of the 6° lateral range of adjustability of the corresponding light fixture.

The panel light fixture of the present invention to meet these various problems comprises a fixedly mounted lamp housing extending rearwardly from the vehicle panel and a light-directing assembly rotatably mounted on the fixed lamp housing. The light-directing assembly is preferably provided with a suitable light-directing means which may be a lens or an annular reflector to form a light beam of the desirable character. Since the lamp housing is stationary, the wiring connected thereto is stationary, so that any flexing or twisting of the wires is avoided. Also, since the lamp housing which extends rearward from the panel does not swing in any lateral direction, the light fixture may be located immediately adjacent a structural member behind the paned and, if desired, two such lighting fixtures may be located immediately adjacent each other.

The light-directing assembly is mounted on the fixed lamp housing by a ball and socket means. For this purpose, the fixed lamp housing has a spherically curved inner circumferential surface and the light-directing assembly has a similarly spherically curved outer circumferential surface that is slidingly embraced thereby. The 46° limit in the fore and aft adjustment of the light-directing assembly is provided by stop means carried by the fixed lamp housing in the path of fore and aft angular movement of the light-directing assembly. In the present practice of the invention, this stop means comprises simply a circular base portion of the fixed lamp housing.

The limitation of 6° in the range of lateral movement of the light beam is accomplished by providing a recess in one of the two spherically curved surfaces of the ball and socket mounting and by providing a projection on the other of the two spherically curved surfaces that extends into this recess. In the preferred practice of the invention, the recess is in the outer circumferential surface of the light-directing assembly and the projection is a radial pin carried by the fixed lamp housing.

The final problem of providing a lamp fixture of this type that may be installed either to swing the light beam through a vertical arc or through an arc in a plane inclined 20° from the vertical is met by providing two recesses in the spherically curved outer circumferential surface of the light-directing assembly for selective cooperation with the radial pin of the fixed lamp housing. For this purpose the radial pin is mounted in the lamp housing in a retractable manner to permit the pin to be shifted from one of the two recesses to the other when the light fixture is installed.

The various features and advantages of the invention may be understood from the following detailed description together with the accompanying drawings.

In the drawings which are to be regarded as merely illustrative:

FIGURE 1 is a longitudinal sectional view showing the preferred embodiment of the invention installed in a circular opening of a ceiling panel;

FIGURE 2 is an enlarged longitudinal section of the lower portion of the light-directing assembly showing how a light shield carrying a lens is incorporated in the assembly;

FIGURE 3 is an enlarged fragmentary longitudinal sectional section of the light-directing assembly showing how it is constructed to receive the lens-carrying light shield;

FIGURE 4 is a transverse section of the same portion of the light-directing assembly showing how the body member of the assembly is machined for cooperation with a marcel spring for releasable engagement with the light shield;

FIGURE 5 is a sectional view like FIGURE 4 showing the marcel spring installed in position for releasable engagement with the light shield;

FIGURE 8a is a perspective view of the lamp housing on a reduced scale;

Figure 6:
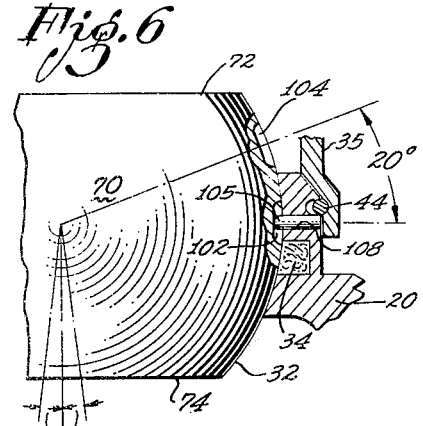
FIGURE 6 is an enlarged fragmentary view, partly in section and partly in side elevation, showing the two recesses in the light-directing assembly and the associated pin in the fixed lamp housing that is adapted to extend into the two recesses selectively.

As shown in FIGURE 1, the panel light fixture of the presently preferred embodiment of the invention comprises a fixedly mounted lamp housing, generally designated by the letter H, and a light-directing assembly, generally designated by the letter A, the assembly being mounted on the housing by a ball and socket arrangement for rotation relative thereto. The lamp housing H has a ring-shaped base portion 20 which fits into a circular opening 22 of a panel 24 which, in this instance, is the ceiling panel of an airplane.

The ring-shaped base portion 20 of the housing H is adapted for fixed engagement with the rim of the circular panel opening 22 and for this purpose is formed with a radial flange 25 to abut the outer or lower face of the panel. Preferably, a suitable gasket 26 is interposed between the flange 25 and the surface of the panel. A ring nut 28 is threaded onto the periphery of the ring-shaped base portion 20 of the housing H to abut the inner or upper surface of the panel 24 and may be readily tightened to fix the lamp housing H rigidly relative to the panel.

The lamp housing H has a spherically curved inner circumferential surface 30 and the light-directing assembly has a complementary spherically curved outer circumferential surface 32 that slidingly fits the circumferential surface 30. This ball and socket arrangement permits the light-directing assembly to be rotated in various directions relative to the lamp housing. In the construction shown, the lamp housing H is formed with an inner circumferential groove to retain an impregnated felt ring 34 in frictional contact with the outer circumferential surface 32 of the light-directing assembly to serve the dual purpose of a dust ring and of means to frictionally retain the light-directing assembly A in any position to which it may be adjusted by a passenger.

Preferably the lamp housing H is made in two sections. The lower section comprises the ring-shaped base portion 20 which retains the felt ring 34. The upper section of the housing is of open construction for free ventilation of the lamp therein and comprises a lower cylindrical ring 35, an upper cylinder 36 of reduced diameter and, as best shown in FIGURE 8a, three interconnecting legs 38 which form three corresponding ventilation openings 40. The upper cylinder 36 of the lamp housing has a pair of diametrically opposite slots 42 and the lower cylindrical ring 35 of the housing is slightly enlarged at its lower end, as shown at 43 in FIGURE 1, for telescopic engagement with the ring-shaped base portion 20 of the housing.

Figure 7:
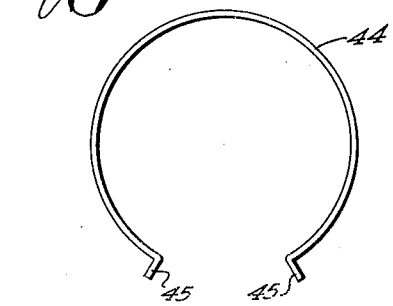
FIGURE 7 is a plan view of a snap ring that is employed to releasably join two sections of the fixed lamp housing.
Figure 8:
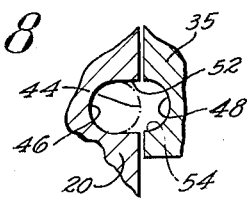
FIGURE 8 is a greatly enlarged sectional view showing how the snap ring of FIGURE 7 is employed with two circumferential grooves in the two sections of the lamp housing.

The two sections of the lamp housing H may be releasably secured together by means of a snap ring 44 which, as best shown in FIGURE 7, is formed with two radially outwardly extending end portions 45. As shown in FIGURES 6 and 8, the ring-shaped base portion 20 of the lamp housing is formed with a circumferential groove 46 and the cylindrical ring 35 of the housing is formed with a similar circumferential groove 48 in registration therewith to receive and cooperate with the snap ring 44. The snap ring 44 is normally expanded into the outer groove 48 which only partially receives the snap ring. Thus, the snap ring 44 normally rests in both grooves 46 and 48 as may be seen in FIGURE 6, the snap ring then engaging a shoulder 52 (FIGURE 8) formed by the groove 46 and a shoulder 54 formed by the groove 48 to hold the two sections of the lamp housing together. As shown in FIGURE 8a, the lower edge of the cylindrical ring 35 of the upper section of the lamp housing is formed with a slot 55 to clear the end portion 45 of the snap ring 44. It is apparent that the two end portions 45 of the snap ring 44 may be pinched together to contract the snap ring into the position shown in FIGURE 8 with the snap ring completely retracted from the groove 48 to permit the upper section of the lamp housing to be separated from the lower section comprising the ring-shaped base portion 20.

A lamp socket assembly 56 (FIGURE 1) of a well known type seats in the upper cylinder 36 of the lamp housing H and engages the diametrical slots 42 (FIGURE 8a) to prevent relative rotation between the socket assembly and the housing. The socket assembly 56 has a bayonet slot 58 for releasable engagement by the usual pin 60 in the base ferrule of a lamp bulb 62. The upper end of the socket assembly 56 is enlarged to carry a pair of terminal screws 64 for connecting the socket assembly to a pair of wires 65 of the lighting circuit. In the construction shown, a rubber guard 66 encases the upper enlarged portion of the lamp socket assembly 56 to cover the terminal screws 64 and the ends of the wires 65 in an insulating manner.

The light-directing assembly A includes a hollow body 70 of solid material which provides the previously mentioned spherically curved outer circumferential surface 32, the body being of the configuration of a truncated sphere with two parallel rims 72 and 74. The lower portion of the hollow body 70 is formed with an inner circumferential wall 75 to receive a cylindrical light shield 76, the construction of which is best shown in FIGURE 2, and this inner circumferential wall is formed with an overhanging flange 78 to abut the inner end of the light shield.

It is contemplated that the cylindrical light shield 76 will be retained in the hollow body 70 in a readily releasable manner by means of a marcel spring 80 that is shown in FIGURE 5 and is formed with a plurality of radially inward undulations 82. For the purpose of seating the marcel spring 80, the hollow body 70 is formed with a circular groove 84 that surrounds the inner circumferential wall 75 and has a bottom surface 85 below the level of the flange 78.

The material of the inner circumferential wall 75 is cut away to provide a circumferential series of slots 85 which open into the surrounding groove 84. A feature of the invention, as may be understood by reference to FIGURE 4, is that the slots 86 may be formed by a milling cutter, the four positions of the milling cutter being indicated by four circles 88 shown in broken lines in FIGURE 4.

The marcel spring 80 seats in the groove 84 on the bottom surface 85 thereof with the undulations 82 extending inward through the slots 86 for releasable engagement with a peripheral groove 90 in the cylindrical light shield 76. While the marcel spring 80 effectively retains the cylindrical light shield 76, nevertheless it will yield to permit the light shield to be removed whenever desired for access to the interior of the lamp housing H. Such access is necessary to permit replacement of a lamp bulb 62.

A feature of the present practice of the invention is that the lower end of the cylindrical light shield 76 is provided with a rim member 92 of resilient plastic material. This rim member 92 may be retained by a snap ring 94, the rim member and the light shield 76 being formed with suitable circumferential grooves for cooperation with the snap ring 94 in a well known manner.

The rim member 92 has a number of functions. One function is to serve as convenient means for grasping the lower end of the light-directing assembly A by a passenger for manipulation of the assembly to direct the light beam in a direction desired by the passenger. Another function is to serve as means to facilitate manually gripping the cylindrical light shield 76 for forcibly withdrawing the light shield from the hollow body 70 when access to the interior of the lamp housing through the hollow body 70 is desired. Still another function of the rim member 92 is to serve as a stop cushion in limiting the fore and aft range of rotation of the light-directing assembly to a range of 46°. At the two extremes of this range of rotation the rim member 92 abuts the surrounding ring-shaped base portion 20 of the lamp housing H.

The cylindrical light shield 76 may carry a light-directing means in the form of a plano-convex lens 95 to form the light beam. As best shown in FIGURE 2, the lens 95 may rest against an inner circumferential shoulder 96 of the light shield 76 and may be retained therein by a wafer spring 98 that is seated in an inner circumferential groove 100 in the light shield. The wafer spring 98 retains the lens 95 in a resilient manner that prevents loosening of the lens in response to the vibration of the airplane.

The spherically curved circumferential surface 32 of the hollow body 70 is formed with two recesses comprising a lower recess 102 and an upper recess 104 and the lamp housing H is provided with a radial pin 105 which may be installed to project into either of these two recesses. In the construction shown, the two recesses 102 and 104 are simply shallow bores.

Figure 11:
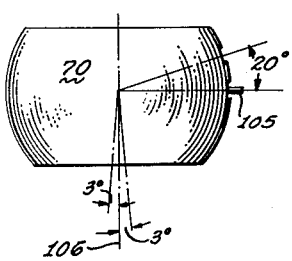
FIGURE 11 is a side elevation similar to FIGURE 9 showing the pin cooperating with the lowermost of the two recesses to cause the body of the light-directing assembly to swing in a vertical plane.
Figure 12:
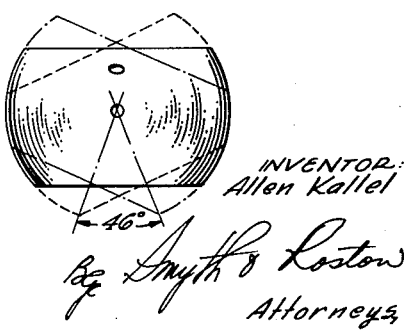
FIGURE 12 is a side elevation at 90° from the side elevation in FIGURE 11 showing how the body may swing through a range of 46° in the vertical plane.

The lower recess 102 is in a diametrical plane that is parallel with the two rims 72 and 74 of the hollow body 70 and the radial pin 105 is installed to extend into this recess when the panel light fixture is directly above a seated passenger, the pin cooperating with the recess to limit the rotation of the hollow body to rotation in substantially a vertical plane. The vertical plane is indicated at 106 in FIGURES 6 and 11. As indicated in these figures, the recess 102 is of sufficiently larger diameter than the radial pin 105 to permit a 3° departure in either lateral direction from the vertical plane 106 and thus provides the previously mentioned 6° range of lateral rotation of the light-directing assembly. As heretofore pointed out, the rotation of the light-directing assembly in this fore and aft vertical plane is limited to a range of 46° by the resilient rim member 92 in cooperation with the surrounding ring-shaped base portion 20 of the lamp housing. FIGURES 11 and 12 show more or less diagrammatically how the cooperation of the radial pin 105 with the lower recess 102 permits the 3° departure of the light-directing assembly A in both lateral directions from the vertical plane and also permits the light-directing assembly to rotate over a range of 46° in that plane.

Figure 9:
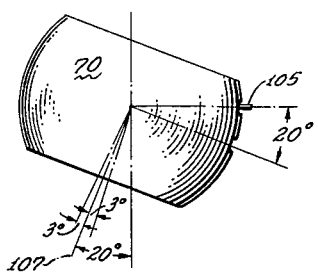
FIGURE 9 is a side elevation of the body of the light-directing assembly showing the pin in the uppermost of the two recesses to cause the assembly to rotate in a plane inclined 20° from the vertical.
Figure 10:
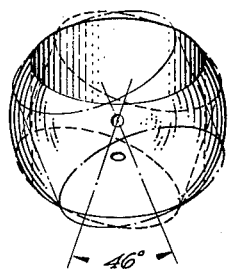
FIGURE 10 is a side elevation as seen at 90° from the side elevation in FIGURE 9 showing how the body of the light-directing assembly may swing to various positions over a range of 46° in the inclined plane.

The upper recess 104 is spaced 20° from the lower recess 102, as measured, the two recesses being in a plane with the axis of the light-directing assembly. As shown in FIGURE 9, when the radial pin 105 cooperates with this upper recess 104, the light-directing assembly A rotates in a plane 107 that is inclined 20° from the vertical. FIGURE 9 also shows how the oversized dimensioning of the recess 104 permits a 3° departure in either lateral direction from the inclined plane 107. FIGURE 10 shows how the light-directing assembly A may be rotated through a range of 46° in the inclined plane.

To permit the light fixture to be installed to function either in the manner shown in FIGURES 9 and 10 or in the manner shown in FIGURES 11 and 12, the radial pin 105 is mounted in the lamp housing 8 in a manner that permits the pin to be retracted so that the pin may be extended into either of the two recesses 102 and 104. For this purpose, the ring-shaped base portion 20 of the lamp housing H may be provided with a radial bore 108 to receive the pin 105 as shown in FIGURE 6. The outer end of this bore is blocked by the lower cylindrical ring 35 of the upper housing section when the two housing sections are releasably interconnected in the previously described manner by the snap ring 44. Thus, it is a simple matter to pinch together the exposed two radial ends 45 of the snap ring 44 to permit the two housing sections to be separated temporarily. With the two housing sections separated, the radial pin 105 may be retracted to permit manipulation of the light-directing assembly. Thus, the radial pin 105 may be shifted from one of the two recesses 102 and 104 to the other as may be desired or may be removed entirely to allow full adjustment in all angles.

The manner in which the invention serves its purpose may be readily understood from the foregoing description. With the two sections of the lamp housing H assembled together and with the radial pin 105 extending into one of the recesses 102 and 104 and with the ring nut 28 separated from the lamp housing, the lamp housing may be backed into the opening 22 in the panel 24. Then the ring nut 28 is screwed onto the base portion 20 of the lamp housing and is tightened to make the lamp housing rigid. The wires 65 are then connected to the terminal screws 64 and the rubber guard or jack 66 is installed.

If the light fixture is to be used by a passenger that is directly under the fixture, the radial pin 105 extends into lower recess 102; but if the light fixture is installed directly above one seat for use by a passenger in an adjoining seat, the radial pin 105 projects into the upper recess 104. It is a simple matter to pinch together the two ends 45 of the snap ring 44 to permit temporary separation of the two housing sections so that the radial pin 105 may be retracted and the light-directing assembly rotated for shift of the radial pin from one of the two recesses to the other.

A passenger for whose use the light fixture is intended finds it an easy matter to grasp the plastic rim member 92 of the light-directing assembly A to swing the assembly for directing the light beam as may be desired. If at any time, it is necessary to replace the lamp bulb 62, the rim member 92 is grasped firmly for the purpose of pulling the cylindrical light shield 76 free from the hollow body 70, the marcel spring wire 80 yielding to permit this separation. When the cylindrical light shield 76 is reinserted into the hollow body 70, the marcel spring wire 80 snaps into its normal engagement with the light shield.

My description in specific detail of the presently preferred embodiment of the invention will suggest various changes, substitutions and other departures from my disclosure within the spirit and scope of the appended claims.

I claim:

1. In a light fixture for installation in an opening in a vehicle panel, the combination of: a lamp housing; means to fixedly attach said housing to said panel at said opening with the housing extending rearward from the panel; a lamp bulb; means mounted on said lamp housing to hold the lamp bulb in fixed position relative to the fixed housing with the axis of the lamp bulb extending forward, said housing having a spherically curved concave surface concentric to a center inside the lamp bulb; means mounted on said lamp housing for connecting said lamp bulb to wiring for energizing the lamp bulb; and an assembly for positioning at said opening to direct light from said lamp bulb forward through the opening, said assembly having a spherically curved convex surface conforming to said concave surface and embraced thereby for swiveling of the assembly about said center to direct the light through a range of angles, said assembly including a light-directing means and a forwardly extending light shield, the interior of said housing being accessible through said assembly to permit replacement of said lamp bulb from the front of the panel.

2. A light fixture as set forth in claim 1 in which said assembly includes a body having said convex surface, said body having a relatively large opening therethrough; in which said light shield comprises cylindrical means removably telescoped into said opening of said body; in which said body has an inner circumferential shoulder and said light shield has an outer circumferential shoulder; and which includes a retaining ring normally engaging both said shoulders to releasably retain said light shield in said body opening.

3. In a light fixture for installation in an opening in a vehicle panel, the combination of: a lamp housing; means to fixedly attach said housing to said panel at said opening with the housing extending rearward from the panel; a lamp bulb; means mounted on said housing to hold the lamp bulb in fixed position relative to the housing; means mounted on said lamp housing for connecting said lamp bulb to wiring for energizing the lamp bulb; a light-directing assembly rotatably supported by said housing for positioning at said opening to direct light from said lamp bulb forward through the opening and to swivel to direct the light through a range of angles, and a light shield included in said light-directing assembly and constituting the forward end thereof, said light-directing assembly having a spherically curved outer circumferential surface concentric to a center within said lamp bulb, said lamp housing having a similarly spherically curved inner circumferential surface slidingly embracing said circumferential surface of the light-directing assembly to retain said assembly with freedom for the assembly to swivel about said center through a range of angles without corresponding movement of the lamp housing, one of said two circumferential surfaces having a recess therein and the other of the two circumferential surfaces having a projection of less cross-sectional area than the recess extending into the recess to permit relatively extensive rotation of the light-directing assembly about a first axis on the diameter of the light-directing assembly that intersects said projection and lesser relative rotation about a second diametrical axis, said lesser rotation being limited to the freedom for relative movement between said projection and said recess.

4. A light fixture as set forth in claim 3 in which rotation of the light-directing assembly about said first axis it limited by stop means on said lamp housing in the path of rotation of the light-directing assembly.

5. A light fixture as set forth in claim 4 in which said stop means is a ring-shaped portion of the lamp housing surrounding said light-directing assembly in the path of movement of said light shield, and in which said light shield abuts said ring-shaped portion to limit the rotation of the light-directing assembly about said first axis.

6. A light fixture as set forth in claim 5 in which said light shield has a rim of yielding material to contact said ring-shaped portion of the lamp housing.

7. A light fixture as set forth in claim 3 in which said recess is in said outer circumferential surface of said light-directing assembly.

8. A light fixture as set forth in claim 7 in which said projection is a pin removably mounted in said lamp housing.

9. A light fixture as set forth in claim 8 in which said pin is removably mounted in a radial bore in said lamp housing, said radial bore being normally closed at its outer end; and in which said housing is made in sections that may be separated to open the outer end of the bore for retraction of said pin from said recess.

10. In a light fixture for installation in an opening in a vehicle panel, the combination of: a lamp housing; means to fixedly attach said housing to said panel at said opening with the housing extending rearwardly from the panel; a lamp bulb; means mounted on said lamp housing to hold the lamp bulb in fixed position relative to the housing; means mounted on said lamp housing for connecting said lamp bulb to wiring for energizing said lamp bulb; and a light-directing assembly extending forward from said lamp housing to direct light from said bulb forward through said opening, said light-directing assembly having a spherically curved outer circumferential surface, said lamp housing having a similarly spherically curved inner circumferential surface slidingly embracing said circumferential surface of the light-directing assembly to retain the assembly with freedom for rotation through a range of angles without corresponding movement of the lamp housing, said outer circumferential surface of the light-directing assembly having two spaced recesses and said lamp housing having a radial projection on said inner circumferential surface to extend into either of said two recesses as may be required for different installations of the light fixture to permit relatively extensive rotation of the shield assembly about a first axis on the diameter of said projection and lesser relative rotation about a second diametrical axis, said lesser rotation being limited by the freedom of relative movement between said projection and the recess into which the projection extends, one of said recesses being located to limit said lesser rotation of the shield assembly to a range which includes a position of the light-directing assembly coaxially of said panel opening, the other of said two recesses being located to limit said lesser rotation to a range at which all positions of the light-directing assembly are at acute angles to the axis of said panel opening, said radial projection normally extending into one of said two recesses.

11. A light fixture as set forth in claim 10 in which said light-directing assembly has a diametrical light passage therethrough and said two recesses are in the same plane as the axis of said light passage.

12. In a light fixture for installation in an opening in a vehicle panel, the combination of: a lamp housing of open construction for ventilation and having a base portion for engagement with the rim of said panel opening to hold the housing in fixed position relative to the panel opening with the housing extending rearwardly from the panel, said base portion having a large opening to pass light therethrough, said base opening having a spherically curved inner circumferential surface extending in both direction from a diametrical plane normal to the axis of the base opening; a lamp bulb; means mounted on said lamp housing to fixedly hold the lamp bulb at the center of curvature of said spherically curved surface; means mounted on said lamp housing for connecting said lamp bulb to wiring for energizing the lamp bulb; a body in said base opening of the lamp housing having a spherically curved outer circumferential surface slidingly nested in said inner circumferential surface of the lamp housing to swivel relative to the lamp housing about said center of curvature, said body having a light passage therethrough; a cylindrical light shield telescoped into said light passage in releasable engagement with said body; a peripheral recess in one of said two spherically curved circumferential surfaces and a projection on the other of the two circumferential surfaces extending into said recess to permit relatively extensive rotation of said body about a first axis on the diameter of said projection and lesser relative rotation about a second diametrical axis, said lesser rotation being limited to the freedom for relative movement between said projection and said recess.

13. A light fixture for installation in an opening in a vehicle panel, the combination of: a lamp housing of open construction for ventilation and having a base portion for engagement with the rim of said panel opening to hold the housing in fixed position relative to the panel with the housing extending rearward from the panel, said base portion having a large base opening to pass light therethrough, said base opening having a spherically curved inner circumferential surface extending in both directions from a diametrical plane normal to the axis of said base opening; a lamp bulb; means mounted on said lamp housing to hold the lamp bulb in fixed position relative to the housing; means mounted on said lamp housing for connecting said lamp bulb to wiring for energizing the lamp bulb; a body in said opening having a spherically curved outer circumferential surface slidingly nested in said inner circumferential surface of the lamp housing to swivel relative to the lamp housing, said body having a light passage therethrough; a cylindrical light shield telescoped into said light passage in releasable engagement with said body; said outer circumferential surface of said body having two spaced recesses and said lamp housing having a radial projection on said inner circumferential surface to extend into either of said two recesses as may be required for different installations of the light fixture to permit relatively extensive rotation of said body about a first axis on the diameter of said projection and lesser relative rotation about a second diametrical axis, said lesser rotation being limited to the freedom for relative movement between said projection and the recess into which it extends, one of said recesses being located to limit said lesser rotation of the body to a range which includes a position of the body coaxially of said panel opening, the other of said recesses being located to limit said lesser rotation to a range at which all positions of the body are at acute angles to the axis of said panel opening, said radial projection normally extending into one of said two recesses.

14. A light fixture as set forth in claim 13 in which said projection is retractably mounted in said lamp housing whereby the projection may be retracted for shift from engagement with one of said two recesses to engagement with the other of the two recesses.

15. A light fixture as set forth in claim 13 in which said projection is a pin in a bore in said lamp housing, the outer end of said bore being blocked to retain said pin therein; and in which said housing is made in sections that may be separated to unblock the outer end of said bore to permit said pin to be retracted for the purpose of shifting the pin from engagement with one of said two recesses to engagement with the other of the two recesses.

16. A light fixture as set forth in claim 1 in which a portion of said assembly is removable for access to the interior of the lamp housing from the front of said panel.

References Cited in the file of this patent

UNITED STATES PATENTS

| | | |
|---|---|---|
| 1,509,783 | Schnell | Sept. 23, 1924 |
| 1,610,126 | Godley | Dec. 7, 1926 |
| 1,697,037 | Witz | Jan. 1, 1929 |
| 1,844,624 | Young et al. | Feb. 9, 1932 |
| 2,041,847 | Marchand | May 26, 1936 |
| 2,278,720 | Follet | Apr. 7, 1942 |
| 2,379,933 | Schwarzmayr | July 10, 1945 |
| 2,536,799 | Divizia | Jan. 2, 1951 |
| 2,782,295 | Schwenkler | Feb. 19, 1957 |